(12) United States Patent
Wong (10) Patent No.: US 8,151,040 B2
(45) Date of Patent: *Apr. 3, 2012

(54) VERSION BASED NON-VOLATILE MEMORY TRANSLATION LAYER

(75) Inventor: Wanmo Wong, Menlo Park, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 12/816,561

(22) Filed: Jun. 16, 2010

(65) Prior Publication Data

US 2010/0250840 A1 Sep. 30, 2010

Related U.S. Application Data

(63) Continuation of application No. 11/136,152, filed on May 24, 2005, now Pat. No. 7,752,381.

(51) Int. Cl.
*G06F 12/00* (2006.01)
(52) U.S. Cl. .......... 711/103; 711/203; 711/E12.008
(58) Field of Classification Search .......... None
See application file for complete search history.

(56) References Cited

U.S. PATENT DOCUMENTS

| | | | |
|---|---|---|---|
| 5,471,604 A | 11/1995 | Hasbun et al. | |
| 5,630,093 A * | 5/1997 | Holzhammer et al. | 711/115 |
| 5,720,031 A | 2/1998 | Lindsay | |
| 5,873,112 A | 2/1999 | Norman | |
| 5,907,856 A | 5/1999 | Estakhri et al. | |
| 5,913,020 A | 6/1999 | Rohwer | |
| 6,069,638 A | 5/2000 | Porterfield | |
| 6,157,398 A | 12/2000 | Jeddeloh | |
| 6,249,853 B1 | 6/2001 | Porterfield | |
| 6,330,654 B1 | 12/2001 | LaBerge | |
| 6,346,946 B1 | 2/2002 | Jeddeloh | |
| 6,377,268 B1 | 4/2002 | Jeddeloh | |
| 6,418,523 B2 | 7/2002 | Porterfield | |
| 6,449,679 B2 | 9/2002 | Ryan | |
| 6,741,254 B1 | 5/2004 | Jeddeloh | |
| 6,907,493 B2 | 6/2005 | Ryan | |
| 7,139,863 B1 | 11/2006 | Defouw et al. | |
| 2004/0015674 A1 | 1/2004 | Lakhani | |

* cited by examiner

*Primary Examiner* — Reginald Bragdon
*Assistant Examiner* — Thanh Vo
(74) *Attorney, Agent, or Firm* — Leffert Jay & Polglaze, P.A.

(57) ABSTRACT

A non-volatile memory and erase block/data block/sector/cluster update and address translation scheme utilizing a version number is detailed that enhances data updating and helps reduce program disturb of the memory cells of the non-volatile memory device. The various embodiments utilize a version number associated with each erase block, data block, sector, and/or cluster. This allows for determination of currently valid data block, sector and/or cluster associated with the logical ID of the data grouping by locating the most recent version associated with the logical ID. With this approach, old data need not be invalidated by programming a valid/invalid flag, avoiding the risk of program disturb in the surrounding data rows.

17 Claims, 10 Drawing Sheets

| 204 | 212 | 206 |
|---|---|---|
| Row 0: Logical Page A | 0 | |
| Row 1: Logical Page B | 1 | |
| Row 2: Logical Page C | 1 | |
| Row 3: Logical Page A | 1 | |
| ⋮ Valid/Invalid Flag | | |
| Row m   User Data | 1 | Control Data | 210
| ⋮  Sector 208 | | |
| Row x | | |

| 224 | 232 | 226 |
|---|---|---|
| Row 0: Logical Page A | 0000 | |
| Row 1: Logical Page B | 0000 | |
| Row 2: Logical Page C | 0000 | |
| Row 3: Logical Page A | 0001 | |
| ⋮ VersionNumber Field | | |
| Row m   User Data | 0000 | Cntl Data | 230
| ⋮  Sector 228 | | |
| Row x | | |

| | Sector 0: Logical Sector A | :1: | Sector 1: Logical Sector B | :1: | Sector 2: Logical Sector C | :0: | Sector 3: Logical Sector D | :0: |
|---|---|---|---|---|---|---|---|---|
| Row 0 | Sector 4: Logical Sector E | :0: | Sector 5: Logical Sector F | :0: | Sector 6: Logical Sector G | :0: | Sector 7: Logical Sector H | :0: |
| Row 1 | Sector 8: Logical Sector I | :0: | Sector 9: Logical Sector J | :0: | Sector 10: Logical Sector K | :0: | Sector 11: Logical Sector L | :0: |
| Row 2 | Sector 12: Logical Sector B | :0: | Sector 13: Logical Sector B | | Sector 14 | | Sector 15 | |
| Row 3 | | | | | | | | |
| Row m | | | | | | | | |
| Row x | | | | | | | | |

VERSION BASED NON-VOLATILE MEMORY TRANSLATION LAYER

RELATED APPLICATION

This application is a Continuation of U.S. application Ser. No. 11/136,152, titled "VERSION BASED NON-VOLATILE MEMORY TRANSLATION LAYER," filed May 24, 2005, U.S. Pat. No. 7,752,381, issued on Jul. 6, 2010, which is commonly assigned and incorporated herein by reference.

TECHNICAL FIELD

The present invention relates generally to integrated circuits and in particular the present invention relates to sector address translation and sector update of non-volatile memory devices.

BACKGROUND

Memory devices are typically provided as internal storage areas in the computer. The term memory identifies data storage that comes in the form of integrated circuit chips. There are several different types of memory used in modern electronics, one common type is RAM (random-access memory). RAM is characteristically found in use as main memory in a computer environment. RAM refers to read and write memory; that is, you can both write data into RAM and read data from RAM. This is in contrast to ROM, which permits you only to read data. Most RAM is volatile, which means that it requires a steady flow of electricity to maintain its contents. As soon as the power is turned off, whatever data was in RAM is lost.

Computers almost always contain a small amount of read-only memory (ROM) that holds instructions for starting up the computer. Unlike RAM, ROM cannot be written to. An EEPROM (electrically erasable programmable read-only memory) is a special type non-volatile ROM that can be erased by exposing it to an electrical charge. EEPROM comprise a large number of memory cells having electrically isolated gates (floating gates). Data is stored in the memory cells in the form of charge on the floating gates. Charge is transported to or removed from the floating gates by specialized programming and erase operations, respectively.

Yet another type of non-volatile memory is a Flash memory. A Flash memory is a type of EEPROM that can be erased in blocks instead of one byte at a time. A typical Flash memory comprises a memory array, which includes a large number of memory cells. Each of the memory cells includes a floating gate field-effect transistor capable of holding a charge. The data in a cell is determined by the presence or absence of the charge in the floating gate. The cells are usually grouped into sections called "erase blocks." The memory cells of a Flash memory array are typically arranged into a "NOR" architecture (the cells arranged in an array of rows and columns, each cell directly coupled to a bitline) or a "NAND" architecture (cells coupled into "strings" of cells, such that each cell is coupled indirectly to a bitline and requires activating the other cells of the string for access). Each of the cells within an erase block can be electrically programmed in a random basis by charging the floating gate. The charge can be removed from the floating gate by a block erase operation, wherein all floating gate memory cells in the erase block are erased in a single operation.

Because all the cells in an erase block of a Flash memory device must be erased all at once, one cannot directly rewrite a Flash memory cell without first engaging in a block erase operation. Erase block management (EBM) provides an abstraction layer for this to the host, allowing the Flash device to appear as a freely rewriteable device.

In non-volatile erase block based memory, such as Flash memory, because erasure is done on a block basis, if a data block/sector is updated the data block/sector cannot simply be written with the new data or, alternatively, directly erased and updated. A data update in non-volatile memory requires that the data be copied to a new location and the old data invalidated. For data integrity purposes the data is moved in the following manner: copying the updated data to the new location, writing the logical ID of the data block/sector to that new location, and finally invalidating the old data in the old data location. To invalidate a data block/sector, the control data section of each data block/sector typically contains a valid/invalid flag which changed from a "1" (an erased cell state) to a "0" (the programmed cell state) to invalidate the data block/sector.

One problem in setting this invalidation flag is that it can lead to program disturb in the surrounding rows and/or sectors of the memory array, affecting the stored charge of the floating gate memory cells of these rows and/or sectors and causing data reliability issues or even physically overwriting the stored data. This program disturb problem is particularly an issue with NAND architecture Flash memory arrays and devices due to their closely spaced array rows. This issue can also be a problem when multi-level memory cells (MLCs), which store multiple memory states in each cell, are utilized.

For the reasons stated above, and for other reasons stated below which will become apparent to those skilled in the art upon reading and understanding the present specification, there is a need in the art for a non-volatile memory device and/or erase block management with improved data invalidation.

BRIEF DESCRIPTION OF THE DRAWINGS

FIGS. 2A and 2C detail encoding of logical sectors and valid/invalid flags in an erase block of a memory system of the prior art.

DETAILED DESCRIPTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

As stated above, the various embodiments relate to non-volatile memory devices and memory subsystems that utilize versioning in writing, updating and moving data in their memory arrays. In embodiments of the present invention, a version number is stored in a version number data field in each erase block, data block, sector, and/or cluster. This allows for determination of currently valid data group associated with the logical ID of the data group by locating the highest version numbered entry for the logical ID in the memory array(s). With this approach, old and out of date data need not be invalidated by programming a valid/invalid flag in the data block/sector, avoiding the risk of program disturb in the surrounding data rows. In one embodiment, a version number data field is stored in the control data area of each data block or sector. In another embodiment, cluster based addressing is utilized in which logical sector addresses are translated to physical block/sector addresses in reference to a cluster ID, wherein each cluster contains a plurality of sequentially addressed logical sectors and a single version number field for the entire cluster. In a further embodiment of the present invention, a specially formatted cluster is utilized for frequently updated sectors, where the cluster stores a single sector and new sequential physical sectors/blocks of the cluster are written in turn with each new update of the logical block until the entire cluster has been used without assigning a new version number. This allows multiple updates of a logical sector without having to move and erase the cluster containing the old data, upon access the highest version numbered random sector cluster is accessed and the last sequential, and therefore most current, sector in it is retrieved. In yet a further cluster addressed embodiment of the present invention, specially formatted clusters/pages/memory areas are utilized for frequently updated sectors, where the specially formatted clusters/pages/memory areas stores frequently updated sectors in a single sector format. This allows the frequently updated sectors to regress to a single sector version number and addressing, wherein each frequently updated sector has its own version number that is incremented with each new update to the sector.

Because all the cells in an erase block of a non-volatile memory device, and in particular, a Flash memory device, are generally erased all at once, one cannot directly rewrite a memory cell without first engaging in a block erase operation. Erase Block Management (EBM), typically under the control of an internal state machine, an external memory controller, or software driver, provides an abstraction layer for this to the host (a system, a processor or an external memory controller), allowing the non-volatile device to appear as a freely rewriteable device, including, but not limited to, managing the logical address to physical address translation mapping with the translation layer, assigning of erased and available erase blocks for utilization, marking old data blocks/sectors as invalid after the data has been moved or updated and written in a new data block/sector, and scheduling erase blocks that have been used and closed out for block erasure. Erase block management also allows for load leveling of the internal floating gate memory cells to help prevent write fatigue failure. Write fatigue is where the floating gate memory cell, after repetitive writes and erasures, no longer properly erases and removes charge from the floating gate. Load leveling procedures increase the mean time between failure of the erase block and non-volatile/Flash memory device as a whole.

As stated above, in an erase block based non-volatile memory, the array is divided into a plurality of individually erasable groups of memory cells called erase blocks, which are each typically further divided into a plurality of 512-byte physical blocks. These 512-byte physical blocks are typically known as sectors after the magnetic disk file system format that many Flash memory devices are formatted to imitate. It is noted, however, that other base data groupings or formats can be used in embodiments of the present invention. Before use, the non-volatile memory is formatted to conform to the data structures and management data fields/tables of the file system or memory structure being represented. Each physical block of the memory array also may contain a header or overhead data area that typically includes various data used in the management of the physical block. This management data can include such items as the status of the physical block (valid, erased/available, or to be erased/invalid) and an error correction code (ECC) for the data of the logical block. In addition, the header typically also includes an identifier that identifies the logical sector address for the physical block.

A translation layer in conjunction with the erase block management manages the storage of logical blocks in non-volatile memory devices or a non-volatile memory subsystem. The client of a translation layer is typically the file system or operating system of an associated system or processor. The goal of the translation layer/EBM layer is to make the non-volatile memory appear as a freely rewriteable device or magnetic disk/hard drive, allowing the client to read and write logical blocks to the coupled non-volatile memory. It is noted that other translation layers can allow the direct reading and writing of data to a non-volatile memory without presenting the non-volatile memory as a formatted file system.

One such freely rewriteable device that many EBM systems are designed to emulate is a magnetic disk formatted to contain a computer file system. Many of the modern computer operating systems, such as "DOS" (Disk Operating System), were developed to support the physical characteristics of hard drive structures; supporting file structures based on heads, cylinders and sectors. A sector (of a magnetic disk drive) is the smallest unit of storage that the DOS operating system supports. In particular, a logical block or sector (referred to herein as a logical block) has come to mean 512 bytes of information for DOS and most other operating systems in existence. Flash and other non-volatile memory systems that emulate the storage characteristics of hard disk drives are preferably structured to support storage in 512 byte sectors along with additional storage for overhead associated with mass storage, such as ECC bits, status flags for the sector or erase block, and/or redundant bits.

As stated above, two common types of Flash memory array architectures are the "NAND" and "NOR" architectures, so called for the resemblance which the basic memory cell configuration of each architecture has to a basic NAND or NOR gate circuit, respectively. Other types of non-volatile memory include, but are not limited to, Polymer Memory, Ferroelectric Random Access Memory (FeRAM), Ovionics Unified Memory (OUM), Nitride Read Only Memory (NROM), and Magnetoresistive Random Access Memory (MRAM).

In the NOR Flash memory array architecture, the floating gate memory cells of the memory array are arranged in a matrix. The gates of each floating gate memory cell of the array are connected by rows to word select lines (word lines) and their drains are connected to column bit lines. The source of each floating gate memory cell is typically connected to a common source line. The NOR architecture floating gate memory array is accessed by a row decoder activating a row of floating gate memory cells by selecting the word line connected to their gates. The row of selected memory cells then place their stored data values on the column bit lines by flowing a differing current if in a programmed state or not programmed state from the connected source line to the connected column bit lines.

A NAND Flash memory array architecture also arranges its array of floating gate memory cells in a matrix such that the gates of each floating gate memory cell of the array are connected by rows to word lines. However each memory cell is not directly connected to a source line and a column bit line. Instead, the memory cells of the array are arranged together in strings, typically of 8, 16, 32 or more each, where the memory cells in the string are connected together in series, source to drain, between a common source line and a column bit line. The NAND architecture floating gate memory array is accessed by a row decoder activating a row of floating gate memory cells by selecting the word select line connected to their gates. In addition, the word lines connected to the gates of the unselected memory cells of each string are also driven. However, the unselected memory cells of each string are typically driven by a higher gate voltage so as to operate them as pass transistors and allowing them to pass current in a manner that is unrestricted by their stored data values. Current then flows from the source line to the column bit line through each floating gate memory cell of the series connected string, restricted only by the memory cells of each string that are selected to be read, thereby placing the current encoded stored data values of the row of selected memory cells on the column bit lines.

The NAND architecture floating gate memory allows for close physical spacing of the cells in the array and produces a memory with a highly dense storage capacity for a given physical die space. This dense cell layout however, leaves the NAND architecture floating gate memory array proportionally more vulnerable to program disturb due to the physically close spacing of the rows of memory cells. For this reason, many NAND architecture floating gate memory cell arrays are intended to be accessed as sequentially as possible, to prevent "backing up" to program previously written rows within the memory array and thus avoid situations where program disturb is more likely.

Figure 1A:
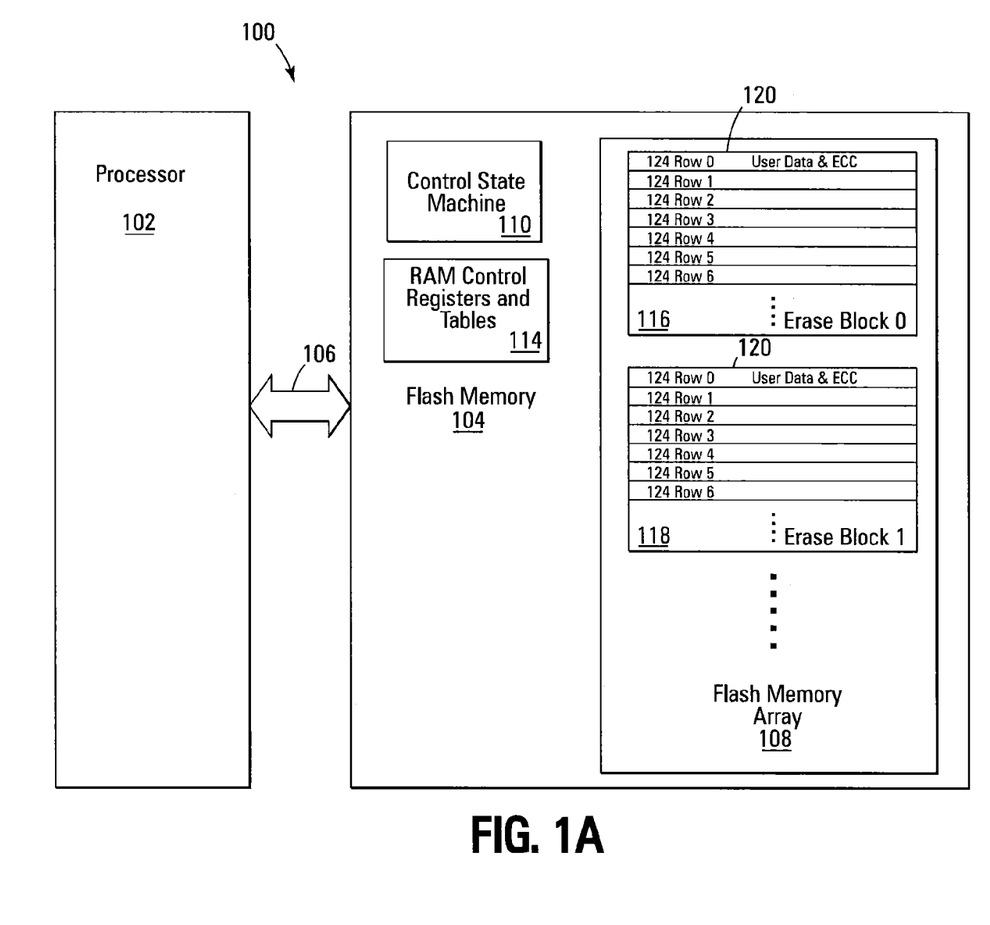
FIGS. 1A and 1B detail memory systems with memory and memory controllers in accordance with embodiments of the present invention.

FIG. 1A is a simplified diagram of a system 100 that incorporates a Flash memory device 104 embodiment of the present invention. In the system 100 of FIG. 1A, the Flash memory 104 is coupled to a processor 102 with an address/data bus 106. Internally to the Flash memory device, a control state machine 110 directs internal operation of the Flash memory device; managing the Flash memory array 108 and updating control registers and tables 114. The Flash memory array 108 contains floating gate memory cells arranged in a sequence of erase blocks 116, 118. Each erase block 116, 118 contains a series of physical pages or rows 120, each page containing physical storage for one or more logical sectors 124 (shown here for illustration purposes as a single logical sector 124 per physical page/row 120) that contain a user data space and a control/overhead data space. The control data space contains overhead information for operation of the logical sector 124, such as an error correction code (not shown), status flags, or an erase block management data field area (not shown). The user data space in each logical sector 124 is typically 512 bytes long. It is noted that other interfaces to the Flash memory 104 and formats for the erase blocks 116, 118, physical pages 120, and logical sectors 124 are possible and should be apparent to those skilled in the art with benefit of the present disclosure. It is also noted that additional Flash memory devices 104 may be incorporated into the system 100 as required. In FIG. 1A, the logical sectors contain version number data fields which are written with a version number when the logical sectors are used to store data, and address translation of the logical sector address to physical sector address in the Flash memory 104 utilizes version based address translation incorporating embodiments of the present invention.

Figure 1B:
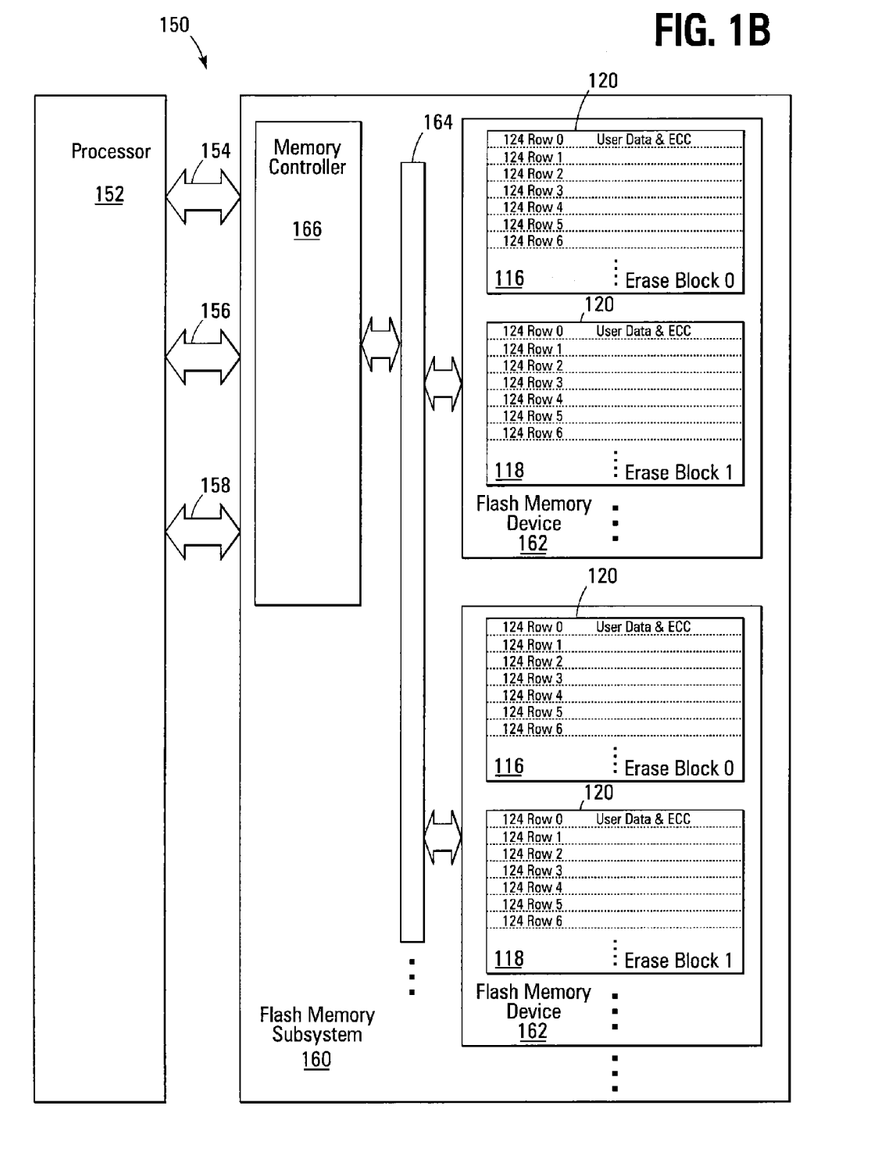

FIG. 1B is a simplified diagram of another system 150 that incorporates a Flash memory system (also know as a memory subsystem) 160 embodiment of the present invention. In the system 150 of FIG. 1B, the Flash memory system 160, such as a memory system or Flash memory card, is coupled to a processor 152 with an address 154, control 156, and data bus 158. Internal to the Flash memory system 160, a memory controller 166 directs internal operation of the Flash memory system 160; managing the Flash memory devices 162, directing data accesses, updating internal control registers and tables (not shown), and/or directing operation of other possible hardware systems (not shown) of the Flash memory system 160. The memory controller 166 is coupled to and controls one or more Flash memory devices 162 via an internal control bus 164. The Flash memory devices 162 each contain a sequence of erase blocks 116, 118 in their internal memory arrays. Each erase block 116, 118 contains a series of physical pages 120, each physical page 120 having one or more logical sectors 124 that contain a user data space and a control/overhead data space (shown here for illustration purposes as a single logical sector 124 per physical page/row 120). The overhead data space can contain an ECC code (not shown) and other overhead information for operation of the logical sector 120, such as status flags, or an erase block management data field area (not shown). The logical sectors 124 of the one or more Flash memory devices 162 each contain version number data fields and the memory controller 166 has an internal version based address translation layer (not shown) that incorporates embodiments of the present invention. The memory controller 166 may optionally incorporate a small local embedded processor to help manage the Flash memory system 160. It is noted that other architectures of Flash memory systems 160, external interfaces 154, 156, 158, and manners of coupling the memory controller 166 to the Flash memory devices 162, such as directly coupled individual control busses and signal lines, are possible and should be apparent to those skilled in the art with benefit of the present disclosure.

Figure 2A:
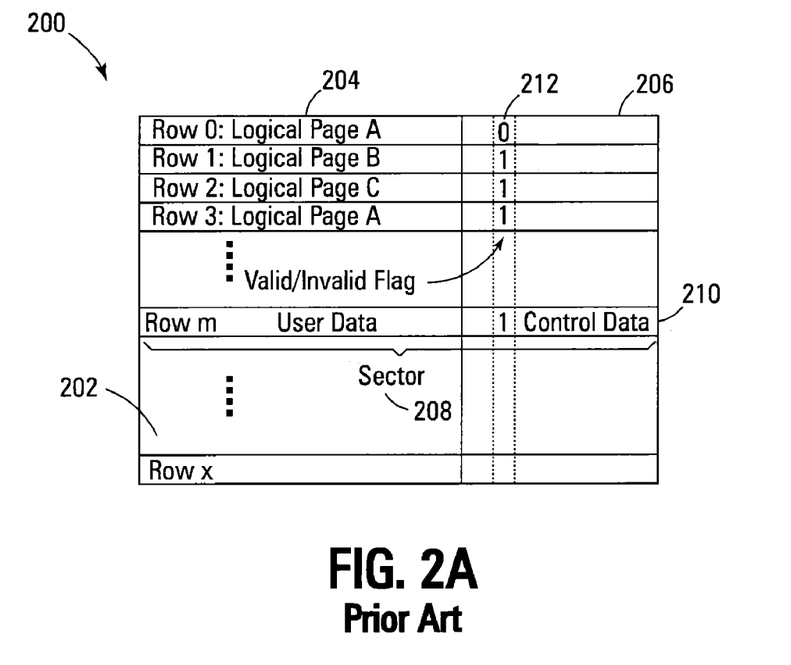
Figure 2B:
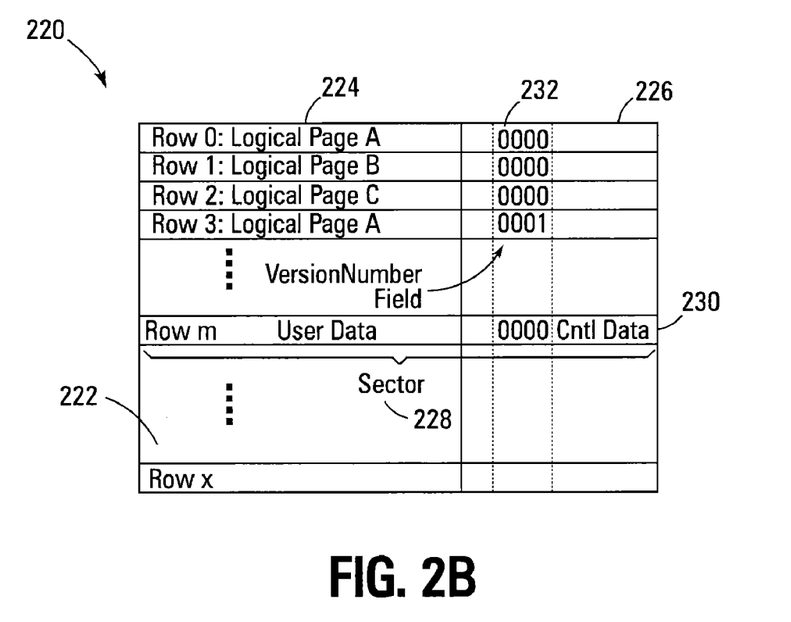
FIGS. 2B and 2D detail encoding of a version based logical sectors with version data fields in accordance with embodiments of the present invention.
Figure 2D:
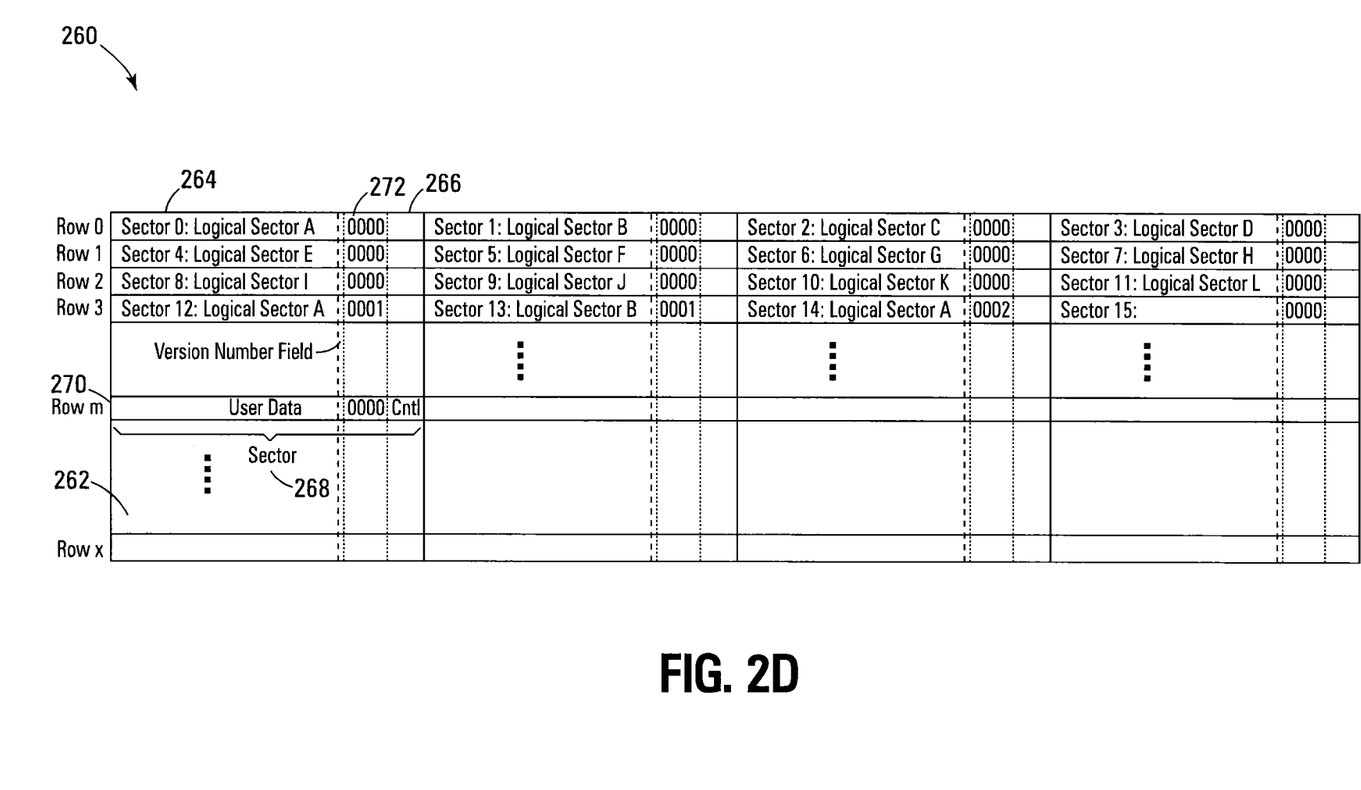

FIGS. 2A and 2C detail prior art encoding 200, 230 of logical sectors incorporating valid/invalid data flags in a Flash memory array. FIGS. 2B and 2D detail encoding 220, 240 of logical sectors incorporating version number data fields in a Flash memory embodiment of the present invention.

In FIG. 2A, user data 204 and header/overhead data 206 are shown in a memory array 202 (or into an erase block N 202 of a memory array) of the prior art, where a single 512-byte logical sector is encoded in each physical page/row 210 of the memory array 202. The memory array 202 contains a series of rows 210, each row containing a sector having a user data area 204 and a control/overhead data area 206. The control data area 206 incorporates a valid/invalid data flag 212 that is programmed from "1" to "0" when the data held in that sector is invalidated. Logical Pages A, B, and C are shown written into Rows 0 to 2 of the memory array 202 of FIG. 2A. Logical Page A is shown as being updated and moved from Row 0 to Row 3, with the old data Logical Page A of Row 0 being invalidated by the programming of the valid/invalid flag 212 from a "1" to a "0".

In FIG. 2C, user data 244 and header/overhead data 246 are shown in a memory array 242 (or into an erase block N 242 of a memory array) of the prior art, where multiple logical sectors 248 are encoded in each physical page/row 250 of the memory array 242, each sector 248 including a valid/invalid data flag 252. As stated above, many memories support multiple logical sectors 248 within a single physical row page 250. In particular, NAND architecture Flash memories typically utilize this approach due to their generally higher memory cell density and larger row page sizes. The memory row 250 contains multiple logical sectors 248, each logical sector 248 having a user data area 244 and a control/overhead data section 246. Logical Sectors A-D, E-H, and I-L are shown written into Rows 0 to 2, respectively, of the memory array 242 of FIG. 2C. Logical Sectors A and B are shown as being updated and moved from Row 0 to new Row 3, with the old data of Logical Sectors A and B of Row 0 being invalidated by the programming of their valid/invalid flags 252 from "1" to "0".

As stated above, the various embodiments relate to non-volatile memory devices and memory subsystems that utilize data versioning in writing, updating and moving data in their memory arrays. In embodiments of the present invention, a version number is stored in a version number data field in each erase block, data block, sector, and/or cluster. This allows for determination of currently valid data group (erase block, data block, sector and/or cluster) associated with the logical ID of the data group by locating the most recent version numbered entry for the logical ID in the memory array(s). With this approach, the step of invalidating the old and out of date data blocks/sector by programming a valid/invalid flag in the data block/sector can be eliminated, simplifying the update programming routine and avoiding the risk of program disturb in the surrounding data rows.

Address translation in memory embodiments of the present invention utilizes the stored version number in combination with the data group's ID (erase block logical ID, sector logical ID, logical data block ID, cluster logical ID) to translate the logical address to the matching physical address, which contain the current data. In this address translation, a number of physical locations in the memory array associated with the logical ID of the data group are located in the memory array. The version number associated with each of these physical locations is then compared to locate the physical location with the most recent stored version number. In one embodiment of the present invention, the version number is preferably stored in a version number data field in each data group. In another embodiment, the version number for each group ID is stored in a look-up table. This physical address with the most recent version number is then utilized for performing the memory access. In a further embodiment of the present invention, an address translation table containing the most recent version numbers of each logical ID of each data group stored in the memory is built upon power-up and utilized in address translation, shortening the time required to locate the highest version number of a data group. This address translation table is then updated to the most current address when a data location is updated or moved in the memory. It is noted that what entails the most recent version number for a given group ID is subjective to the numbering scheme utilized in the versioning and includes, but is not limited to, the highest numbered version number for a given group ID, the lowest numbered version number, or the version number that is furthest along in a defined sequence of codes.

Updating a memory location in an embodiment of the present invention simply requires that the modified or copied data be written to an available erased location with the associated logical ID. In this updating operation, the version number is simply incremented (or decremented or advanced to the next code of the sequence) and written to the new location. Unlike the prior art, which requires that the old data in the old location be invalidated in a separate write operation after the new location is written, no programming operation to invalidate old data is required in embodiments of the present invention. Version numbers in one embodiment of the present invention are 32-bits in size, allowing for $2^{32}$ updates before rolling over. This is far greater than the expected number of lifetime writes of a modern floating gate memory and thus roll over should not be an issue in the useful lifetime of the part. In another embodiment, an 8-bit version number is utilized, allowing 256 updates before rolling over and the active version numbers of a logical sector are reviewed by the EBM firmware during an access to determine the most recently updated logical sector and to determine if rollover has occurred. It is noted that rollover can be determined by various methods that will be apparent to those skilled in the art with the benefit of the present disclosure, including, but not limited to, a rollover flag bit, maintaining a version number gap between the most recent version number and the oldest, and maintaining an active reclaim process for older version numbers. It is also noted that the 8-bit and 32-bit version data fields are not to be taken as a limitation and that other version number data field sizes for embodiments of the present invention are possible.

When an erase block based non-volatile memory is full, underutilized erase blocks are erased and made available for future use though a process called reclaiming. In the reclaiming process or during general block erasure, the remaining valid data of an erase block selected for erasure is consolidated and moved to a new location to free the erase block up to be erased in a process called garbage collection. The erase block is then erased and made available again for use in the memory to store new data. In version based non-volatile memory embodiments of the present invention, the old locations of data moved out of the erase block during garbage collection need not be invalidated before erasure as in non-volatile memories of the prior art. In addition, because of the size of the (32-bit) version number data field of one embodiment of the present invention or an embodiment of the present invention wherein the version number data field is rollover enabled, the version numbers of the data groups that are consolidated and moved to a new erase block during garbage collection need not be reset to their initial values during the move process as their older, lower numbered, versions are erased with the old erase block.

In embodiments of the present invention, wherein a logical erase block ID and version number is assigned to the utilized erase blocks of the memory, erase blocks that are to be updated, moved, or copied into a new erase block location in the memory simply have to write the modified or copied data to an available blank or reclaimed erase block location which is subsequently written with the associated logical erase block ID. The erase block version number is then incremented (or decremented or advanced to the next code of the sequence) and written to the new location. Unlike the prior art, which requires that the old erase block in the old location be invalidated in a separate write operation after the new erase block is written, no programming operation to invalidate old erase block is required in embodiments of the present invention. In reclaiming version numbered erase blocks of the present invention, the reclaiming process consolidates and moves the remaining valid data of an erase block selected for erasure to the new erase block location, which is then written with the logical erase block ID of the old erase block and incremented version number. The old erase block is then erased and made available for use again.

In FIG. 2B, user data 224 and header/overhead data 226 are shown in a memory array 222 (or into an erase block N 222 of a memory array) of an embodiment of the present invention. The memory array 222 contains a series of rows 230, each row containing a sector having a user data area 224 and a control/overhead data area 226. The control data area 226 incorporates a version number data field 232 that is programmed with a version number when the data held in that sector is initially written. Logical Pages A, B, and C are shown written into Rows 0 to 2 of the memory array 222 of FIG. 2B. Logical Page A is shown as being updated and moved from Row 0 to Row 3 and written with a new version number of "0001H" as incremented from the original version number of "0000H" stored in Row 0.

In FIG. 2D, user data 264 and header/overhead data 266 are shown in a memory array 262 (or into an erase block N 262 of a memory array) of an embodiment of the present invention, where multiple logical sectors 268 are encoded in each physical page/row 270 of the memory array 262, each sector 268 including a version number data field 272. Each memory row 270 contains multiple logical sectors 268, each logical sector 268 having a user data area 264 and a control/overhead data section 266. In an example implementation, the row page 270 of FIG. 2D contains 2112 bytes of data (4×512 bytes user data+4×8 bytes ECC+32 bytes for overhead) and is formatted to contain four logical sectors 268 having a user data area 264 of 512-bytes each. The four logical sectors 268 are typically sequentially addressed N, N+1, N+2, and N+3, particularly in cluster addressed embodiments, where N is a base logical sector address for the row page 270. It is noted that the row pages 230 and 270 of FIGS. 2B and 2D are for illustration purposes and that other row page sector formats of differing data sizes, numbers of logical sectors, and relative positioning of sectors are possible. Logical Sectors A-D, E-H, and I-L are shown written into Rows 0 to 2, respectively, of the memory array 262 of FIG. 2D. Logical Sectors A and B are shown as being updated and moved from Row 0 to new Row 3 and written with a new version numbers of "0001H" as incremented from the original version numbers of "0000H" for Logical Sectors A and B stored in Row 0. Logical Page A is shown as being updated a second time and moved from Sector 12 in Row 3 to Sector 14 of Row 3 and written with a new version number of "0002H" as incremented from the updated version number of "0001H".

Figure 3:
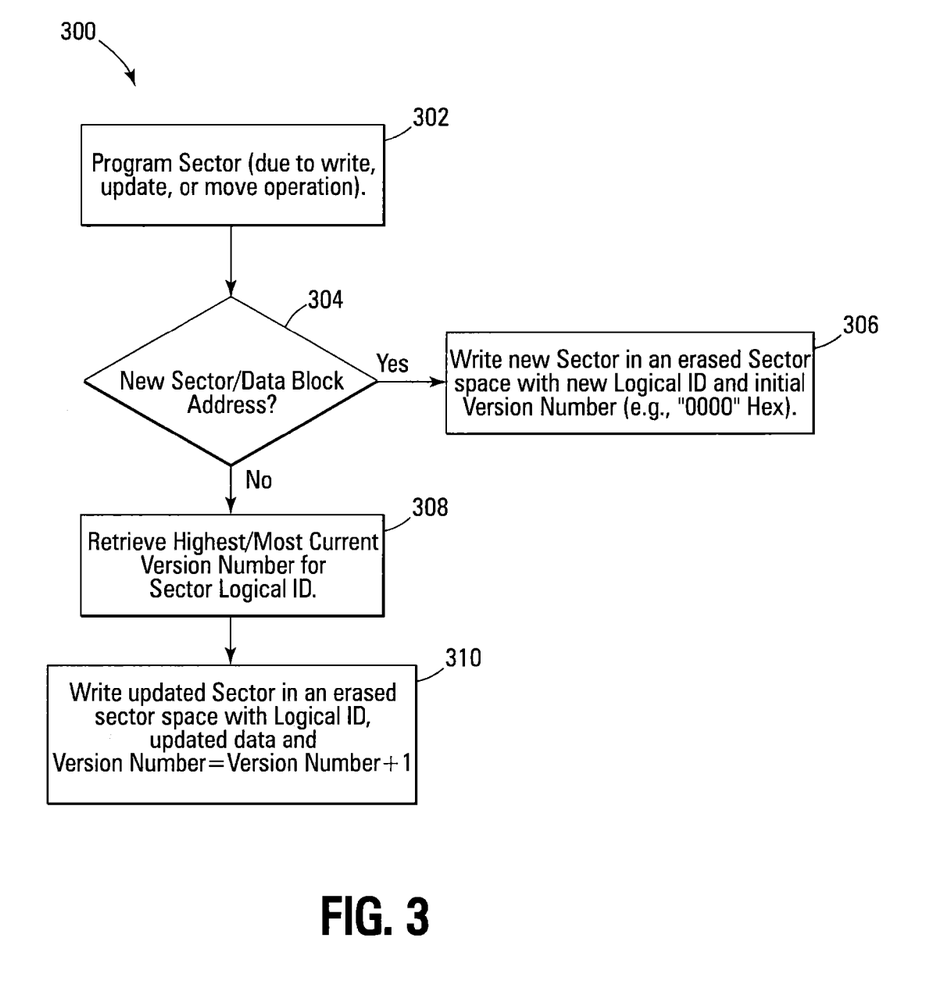
FIG. 3 details a flowchart of versioning based logical sector update in accordance with embodiments of the present invention.

FIG. 3 details a state transition diagram 300 of a program operation for a version based address translation system of non-volatile memory devices of the present invention. As shown in FIG. 3, a logical sector is programmed 302 due to a write, update, or move operation in a non-volatile memory of the present invention. The address of the logical sector to be programmed is checked to see if it is already written in the non-volatile memory array 304. If the logical address/ID is not already present in the non-volatile memory it is written 306 to an available physical sector in the memory array with a selected initial version number, such as "0000". If the logical address/ID is already present in the memory array, the highest existing version number stored in association with the logical address/ID in the array is retrieved 308. This version number is incremented and the data is written into an available erased physical sector with the updated data 310.

Various alternative embodiments of the present invention utilize cluster logical sector to physical block/sector address translation in combination with versioning in non-volatile memory devices and memory subsystems. Cluster based logical sector to physical block/sector address translation is described in U.S. patent application Ser. No. 10/933,017, filed on Sep. 2, 2004, titled "CLUSTER BASED NON-VOLATILE MEMORY TRANSLATION LAYER", and is commonly assigned. In cluster addressing and address translation, the non-volatile memory device or non-volatile memory subsystem is divided into a plurality of sequentially addressed clusters, wherein each cluster contains a plurality of sequentially addressed logical blocks or sectors. In one example embodiment, a cluster contains 4 sequential logical sectors, in another embodiment a cluster contains 8 or 16 sequential logical sectors. Address translation to translate a logical sector address to the corresponding physical block/sector address is then performed by a table lookup of the logical cluster address of the cluster containing the logical sector and returns the base physical address of the cluster in the non-volatile memory. An address offset from the cluster base address or a short physical scan can then be used to access the requested logical sector, which is sequentially addressed within the cluster. Cluster address translation allows close matching of data storage use, in addition, the reduced number of base cluster addresses allows the use of a smaller lookup table that contains only the cluster addresses, allowing a smaller RAM footprint for the table.

In cluster addressing, each cluster containing a number of sequentially addressed logical sectors is typically written, updated, and/or moved as a unit. As a result, in version-based cluster addressing embodiments of the present invention, a single version number data field is stored with each physical cluster in the memory array, versioning each cluster individually. This allows the memory device or system to distinguish the currently valid cluster associated with the logical cluster ID by locating the highest version numbered entry in the memory array(s). As related above, the step of invalidating the old and out of date cluster by programming a valid/invalid flag in the cluster is eliminated, simplifying the update programming routine and avoiding the risk of program disturb in the surrounding data rows.

Address translation in version based cluster addressing memory embodiments of the present invention utilizes the stored version number in combination with the logical cluster ID that contains the addressed logical sector to translate the logical address to the matching cluster physical address, which contains the most current data. In this address translation, a number of cluster physical locations in the memory array are located within the memory array, which are associated with the logical cluster ID and contain the addressed logical sector. The version number of these locations is then compared to locate the physical cluster with the highest stored version number. This physical cluster with the highest version number is then utilized for performing the memory access. In one embodiment of the present invention, an address translation table containing the physical cluster address of the highest version numbers of each logical cluster ID is built upon power-up and kept updated for use in address translation, shortening the time required to locate the highest version number and physical cluster address of a logical cluster address/ID.

In updating a memory location in cluster addressing embodiments of the present invention, because of the larger data size of the cluster, the cluster may be updated and the new data sectors be written without having to move the cluster and increment the version number. However, this typically can only be done if a new logical sector is being added into an unwritten sector data space in the cluster. This situation usually only occurs with an update where the next sequentially addressed sector of the cluster is being written onto the end of the cluster.

In addition, in some non-volatile memory devices and arrays that are sensitive to program disturb, if data is written into a sector space in a row that is "above" already written data in the array, there can be the increased possibility of program disturb in the data written in rows of the array "below" the row that is desired to be updated (below the selected row in that it has physical address that is higher in the erase block than the selected row). Memory devices and arrays that are sensitive to this kind of program disturb are of a type that is sensitive to what is called "backing up" within the array and therefore should have their rows written sequentially or directionally written to minimize the possibility of disturb. Thus in these memory devices, the new data sectors should typically only be written onto the end of an existing cluster only if the unwritten sector space is available AND if there is no data written into rows of the array "below" the unwritten sectors without risking the increased possibility of program disturb.

If space is not available and an updated cluster cannot be updated in the above manner, it must be moved as described above for a single sector and the modified or copied cluster data written to an available erased cluster location with the associated logical cluster address/ID and an incremented version number. As with the single data sector updating, the version numbers in cluster addressing embodiments of the present invention are preferably 32-bits in size, allowing for $2^{32}$ updates before rolling over or 8-bits in size, allowing for 256 possible versions, wherein the possibility of rollover is specifically accounted for.

In another embodiment of the present invention, to improve handling of frequently updated data sectors in version-based cluster addressing, a type of cluster called a random sector cluster is utilized to store frequently updated logical sectors. This allows the cluster addressing translation layer to avoid the drawback of having to frequently copy, update and invalidate/erase a cluster containing an often updated logical sector, which can potentially cause excessive wear on the non-volatile memory and premature write fatigue failure of the part. A memory of the present invention will typically contain only a limited number, such as 64, of these random sector clusters. They are also preferably limited in number so as to fit completely within the space available in one or more erase blocks. In translating an accessed address in cluster addressing memories of the present invention incorporating random sector clusters, the requested address would be checked against a table of logical sectors that are stored in random sector clusters to see if a match occurs and if no match occurs would being translated against the main cluster address table.

In one embodiment of the present invention utilizing the special random sector cluster, the cluster stores the time-wise updated sequence of a single sector with a single version number in a format known as a page of logical sectors or single sector cluster. In this embodiment, a new copy of the sector of the cluster is written in turn onto the current end of the cluster with each new update of the stored data without having to update the version number. This may continue until the entire cluster has been used up, allowing for multiple updates of a logical sector without having to move the cluster and assign an incremented version number.

Additionally, during the update of random sector clusters, the above detailed issue of disturb-sensitive rows, may require that a random sector cluster be moved and the version number incremented even though still unwritten sectors exist because of existing sectors that are physically located below it in the array and are already written with data. Therefore in non-volatile memory arrays with disturb-sensitive rows, these random sector clusters should only be updated with a new sector only if unwritten sector space is available in the random sector cluster AND there is no data written into rows of the array "below" the unwritten sector. It is also noted that the concept of a random sector cluster, with its multiple updates of a frequently updated sector within an assigned cluster area or row, can be used in non-cluster addressed non-volatile memory embodiments of the present invention to reduce write fatigue and allow for multiple updates of frequently updated logical sector without having to move the sector and assign a new version number.

In another embodiment of the present invention utilizing frequently updated sector clusters or areas, the clusters/areas are utilized to store each frequently updated single sector with its own version number as each is written or updated. In this embodiment, a new copy of the sector is written in turn onto the next available space with each new update of the stored data with an updated individual sector version number within the reserved frequently updated sector clusters. In this way, instead of being associated with a cluster and a cluster version number that must be copied for each new update, only the frequently updated sector and its individual sector version number are written and incremented for each new update (in effect regressing the address translation from a cluster based addressing back to a single sector addressing for only these frequently updated sectors that are stored in the reserved frequently updated sector clusters), allowing for multiple updates of frequently updated logical sectors without having to move and update the whole cluster they are associated with.

Figure 4A:
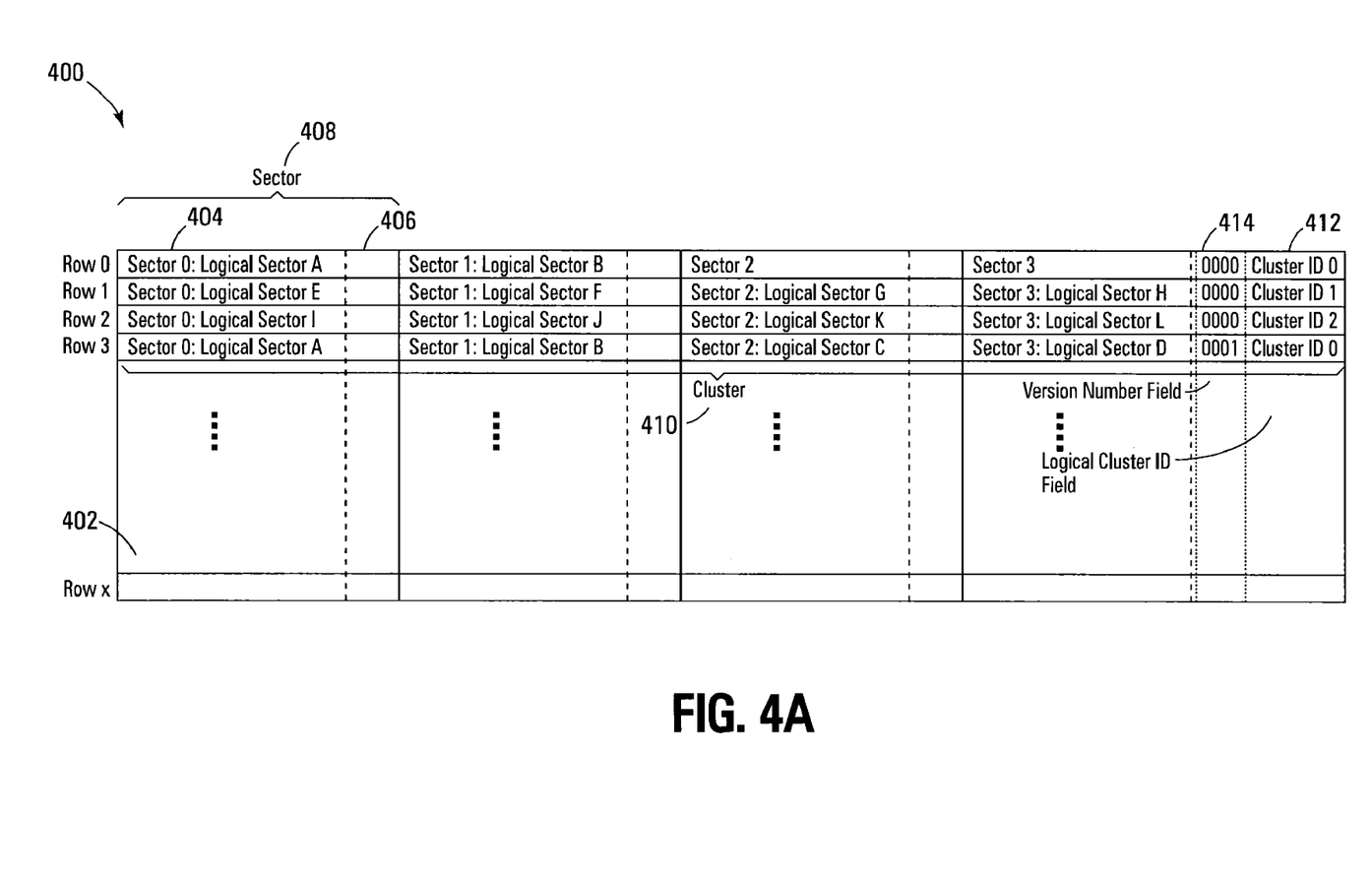
FIGS. 4A and 4B detail block encoding of cluster based logical sectors with version data fields in accordance with embodiments of the present invention.
Figure 4B:
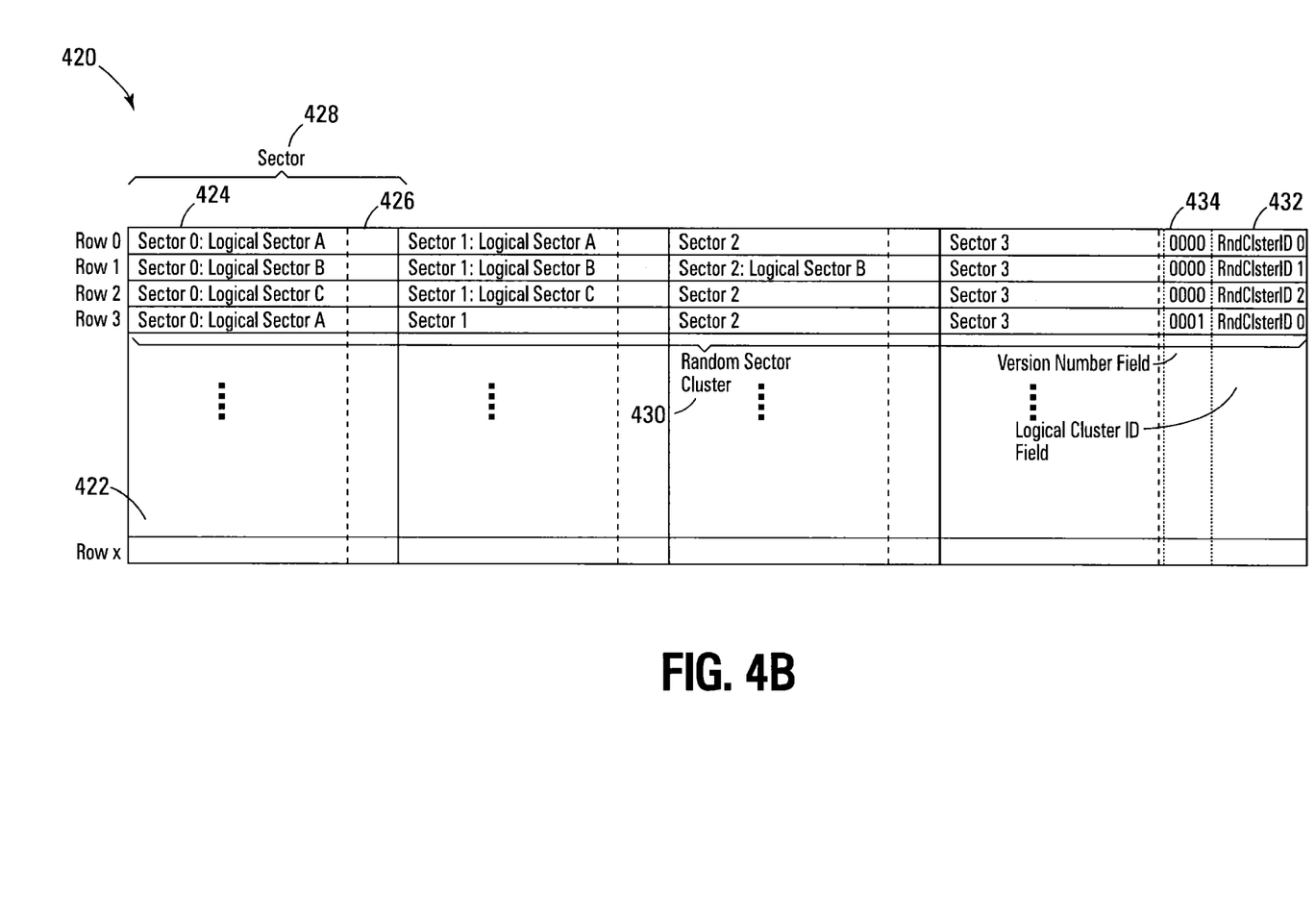

FIGS. 4A and 4B detail encoding 400, 420 of clusters and random sector clusters of cluster addressed memories incorporating version number data fields in a non-volatile memory embodiment of the present invention.

In FIG. 4A, user data 404 and control/overhead data 406 are shown in a memory array 402 (or into an erase block N 402 of a memory array) of an embodiment of the present invention, where multiple clusters 410 are encoded in the memory array, each cluster 410 containing multiple logical sectors 408. In the array 402 of FIG. 4A, the clusters 410 are defined such that each cluster 410 incorporates a single physical page/row of the memory array 402 and contains four sequentially addressed logical sectors 408 (N, N+1, N+2, and N+3, where N is a base logical sector address of the cluster 410). It is noted that other embodiments of the present invention having clusters that contain other arrangements of one or more sectors on each physical row and/or clusters 410 that incorporate one or more physical rows of the memory array 402 are possible and will be apparent to those skilled in the art with the benefit of the present disclosure. Each cluster 410 incorporates a logical cluster ID data field 412 and a version number data field 414. Logical Sectors A-B, E-H, and I-L are shown written into Cluster IDs 0-2 (Rows 0 to 2), respectively, of the memory array 402 of FIG. 4A. Logical Sectors A and B are shown as being initially written to Cluster ID 0 (Row 0), and then having Logical Sectors E-H and I-L written into Cluster ID's 1-2. Cluster ID 0, containing Logical Sectors A and B, is then shown as being updated with the addition of Logical Sectors C and D and moved from Row 0 to new Row 3 with a new version number of "0001" assigned to Cluster ID 0. This is due to having data in Clusters 1 and 2 (Rows 1 and 2) which are "below" the Sectors of Cluster ID 0 in Row 0 that need to be written to, even though these Sectors are blank in Row 0.

In FIG. 4B, user data 424 and control/overhead data 426 are shown in random sector clusters 430 of a memory array 422 (or into an erase block N 422 of a memory array) of an embodiment of the present invention, where multiple random clusters 430 are encoded in the memory array/erase block 422, each cluster 430 containing multiple time-wise updated copies of the same logical sector 428. In the array 422 of FIG. 4B, the clusters 430 are defined such that each cluster 430 incorporates a single physical page/row of the memory array 422 and contains four logical sectors 428. Each random sector cluster 430 incorporates a logical random cluster ID data field 432 and a version number data field 434. Logical Sectors A-C are shown written into Cluster IDs 0-2 (Rows 0 to 2), respectively, of the memory array 422 of FIG. 4B. Logical Sectors A-C have been each initially written to Cluster IDs 0-2 (Rows 0-2), and then updated once in a sequential manner (Logical Sector A then B then C for both initial write and first update). Logical Sector B was then updated a third time. Logical Sector A was then updated a third time and moved from Row 0 to new Row 3 and written to the first physical sector of the random sector cluster with a new version number of "0001". This is due to having had Logical Sector B in Row 1 updated a third time into Sector 2 of Row 1, so that the unutilized Sectors of Random Sector Cluster ID 0 of Row 0 then had data "below" them (Logical Sector B in physical Sector 2 of Row 1).

It is noted that the row pages 400 and 420 of FIGS. 4A and 4B are for illustration purposes and that other cluster and row page sector formats of differing data sizes, numbers of logical blocks/sectors, relative positioning and programming disturb sensitivity of clusters, rows and sectors are possible.

Figure 5A:
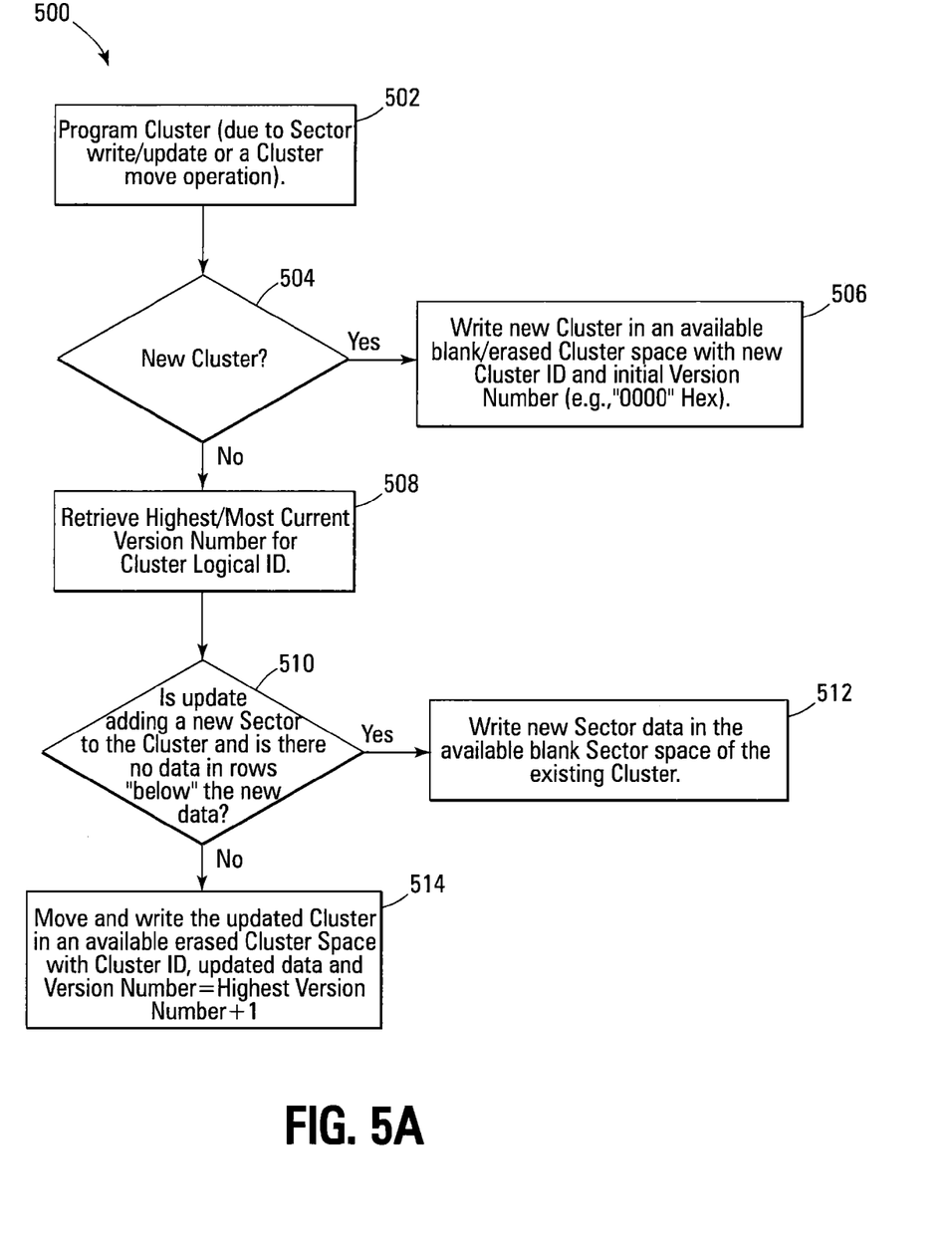
FIGS. 5A and 5B detail flowcharts of cluster based logical sector version update in accordance with embodiments of the present invention.

FIG. 5A details a state transition diagram 500 of a program operation for a version based cluster address translation system of non-volatile memory devices of the present invention. As shown in FIG. 5A, one or more logical sectors of a cluster are programmed 502 due to a write, update, or move operation. The address of the cluster to be programmed is checked to see is already written in the non-volatile memory array 504. If the logical cluster is not already present in the non-volatile memory it is written 506 to an available physical cluster in the memory array with a selected initial version number, such as "0000". If the logical cluster is already present in the memory array, the highest existing version number stored in association with the logical address/ID in the array is retrieved 508. If unwritten sector space is available in the cluster, the existing cluster is updated by writing the new logical sectors into the blank sectors at the end of the cluster 512. In an alternative embodiment, if the non-volatile memory array contains disturb sensitive rows, the existing cluster can be optionally updated by writing the new logical sectors into the blank sectors at the end of the cluster 512 if unwritten sector space is available in the cluster AND there is no data written into rows of the array "below" the unwritten sector 510. If an existing logical sector of the cluster is being updated OR there is data "below" the physical cluster in the array the version number is incremented and the updated cluster data is written into an available erased physical cluster 514.

Figure 5B:
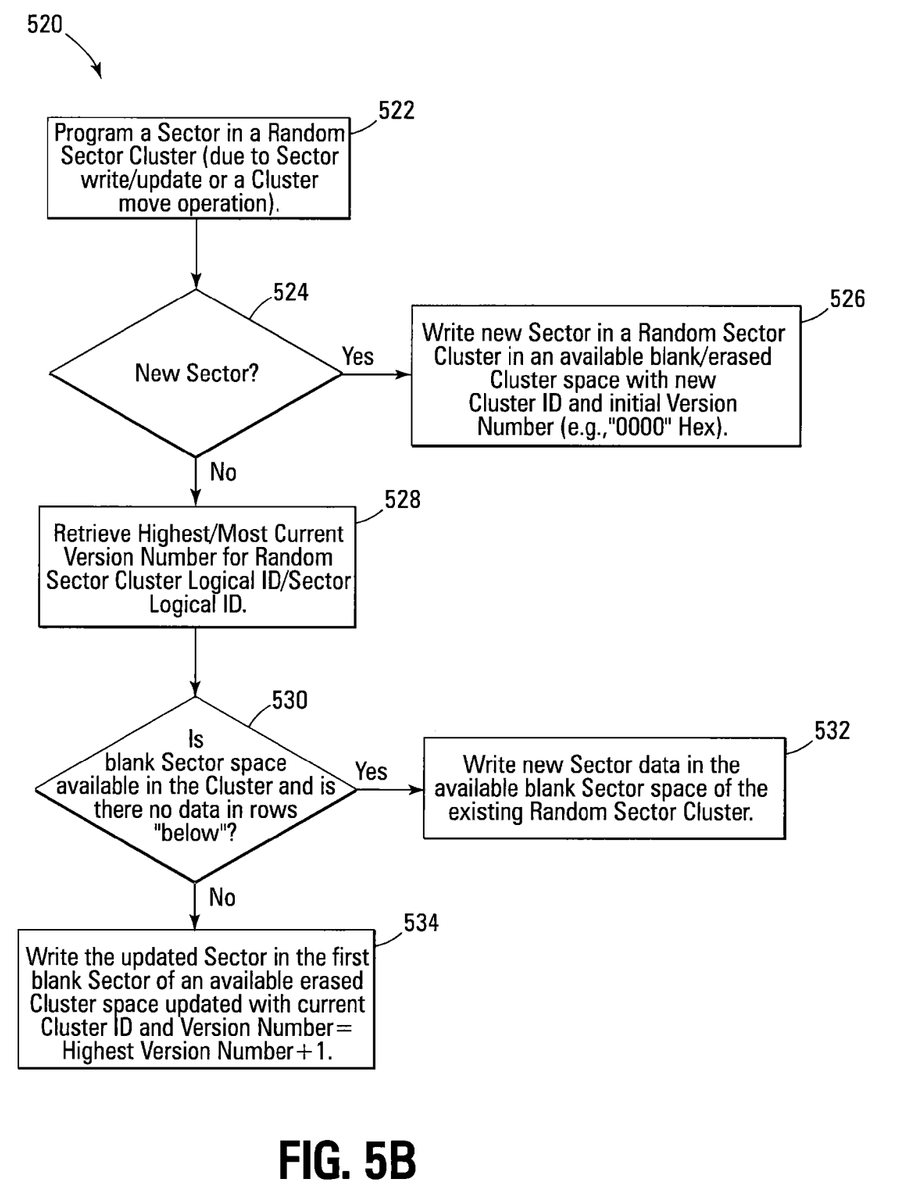

FIG. 5B details a state transition diagram 520 of a program operation for a version based cluster address translation system with random sector clusters of non-volatile memory devices of the present invention. As shown in FIG. 5B, a frequently updated logical sector stored in a random sector cluster are programmed 522 due to a write or update operation. The address of the random sector cluster to be programmed is checked to see is already written in the non-volatile memory array 524. If the logical random sector cluster is not already present in the non-volatile memory it is written 526 to an available random sector cluster in the memory array with a selected initial version number, such as "0000". If the logical random sector cluster is already present in the memory array, the highest existing version number stored in association with the logical address/ID in the array is retrieved 528. If unwritten sector space is available in the random sector cluster, the existing random cluster is updated by writing the new logical sectors into the blank sectors at the end of the cluster 532. In an alternative embodiment, if the non-volatile memory array contains disturb sensitive rows, if unwritten sector space is available in the random sector cluster AND there is no data written into rows of the array "below" the unwritten sectors 530 the existing cluster can be optionally updated by writing the new logical sectors into the blank sectors at the end of the cluster 532. If an existing logical sector of the cluster is being updated OR there is data "below" the physical cluster in the array the version number is incremented and the updated cluster data is written into an available erased physical cluster 534.

It is noted that other cluster based address translation apparatuses and methods incorporating embodiments of the present invention are possible and will be apparent to those skilled in the art with the benefit of this disclosure.

CONCLUSION

An improved non-volatile memory and erase block/data block/sector/cluster update and address translation scheme utilizing a version number has been detailed that enhances data update and helps minimize program disturb of the memory cells of the non-volatile memory device. The various embodiments utilize a version number stored in a version number data field in each erase block, data block, sector, and/or cluster. This allows for determination of currently valid data block, sector and/or cluster associated with the logical ID of the data grouping by locating the highest version associated with the logical ID. With this approach, old data need not be invalidated by programming a valid/invalid flag, avoiding the risk of program disturb in the surrounding data rows. In one embodiment, a version number data field is stored in the control data area of each data block or sector. In another embodiment, cluster based addressing is utilized in which logical sector addresses are translated to physical addresses in reference to a cluster, wherein each cluster contains a plurality of sequentially addressed logical sectors and a single version number field. In a further embodiment of the present invention, a specially formatted cluster is utilized for frequently updated sectors, where the cluster stores a single logical sector and new sequential physical sectors of the cluster are written in turn with each new update of the logical block until the entire cluster has been used. This allows multiple updates of a logical sector without having to move and erase the cluster containing the old data.

The various embodiments relate to non-volatile memory devices and memory subsystems that utilize a version number stored in a version number data field in each erase block, data block, sector, and/or cluster. This allows for determination of currently valid erase block, data block, sector and/or cluster (referred to herein as "data grouping" or "data group") associated with the logical ID of the data grouping by locating the highest version associated with the logical ID. With this approach, old data need not be invalidated by programming a valid/invalid flag, avoiding the risk of program disturb in the surrounding data rows. In one embodiment, a version number data field is stored in the control data area of each data block or sector. In another embodiment, cluster based addressing is utilized in which logical sector addresses are translated to physical block/sector addresses in reference to a cluster, wherein each cluster contains a plurality of sequentially addressed logical sectors and a single version number field. In a further embodiment of the present invention, a specially formatted cluster is utilized for frequently updated sectors, where the cluster stores a single sector and new sequential physical sectors of the cluster are written in turn with each new update of the logical sector until the entire cluster has been used. In yet a further embodiment of the present invention, one or more specially formatted clusters are utilized for frequently updated sectors, where the clusters store one or more frequently updated sectors and assign an individual version number to each individual sector so that both the sector and version number are written when the sector is updated. Both of these approaches allow multiple updates of a logical sector without having to move and erase the cluster containing the old data.

For one embodiment, the invention provides a non-volatile memory device comprising a memory array having a plurality of non-volatile memory cells arranged in a plurality of data groups, wherein each data group contains a version data field, and a control circuit, wherein the control circuit is configured to access a data group from the memory array by translating a logical address of the data group to a physical data group address of the memory array in reference to a version number stored in the version number data field of the data group.

In another embodiment, the invention provides a system comprising a host coupled to a non-volatile memory device, wherein the system is configured to store logical sectors of data in the non-volatile memory device, where each logical sector is associated with a version number stored in a version number data field.

In yet another embodiment, the invention provides a method of operating a non-volatile memory comprising storing a version number associated with a logical data group stored in the non-volatile memory.

In a further embodiment, the invention provides a method of operating a non-volatile memory comprising translating a logical address of the logical sector to a physical sector address by using a stored version number and the logical address to retrieve the physical sector containing the most recent version number which is associated with the logical address of the accessed logical sector.

In yet a further embodiment, the invention provides a non-volatile memory device comprising a memory array having a plurality of non-volatile memory cells arranged in a plurality of clusters, wherein each cluster contains a plurality of sequentially addressed logical sectors, a plurality of version data fields, each version data field associated with a cluster of the plurality of clusters, and a control circuit, wherein the control circuit is configured to access a sector from the memory array by translating a logical address of the sector to a physical sector address of the memory array in reference to a logical cluster address and a version number stored in the version number data field associated with each of the physical clusters associated with the logical cluster address.

In another embodiment, the invention provides a method of operating a non-volatile memory comprising storing a version number associated with a logical cluster address stored in the non-volatile memory, wherein each cluster contains a plurality of sequentially addressed logical sectors.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

What is claimed is:

1. A memory device comprising:
a memory array having a plurality of memory cells arranged in a plurality of data groups, wherein each data group is identified by a data group identification and contains a version data field comprising a version number that indicates a version of a particular data group identification, wherein the version number is configured to indicate more than two versions; and
a control circuit, wherein the control circuit is configured to access a data group by translating a logical address of the data group to a physical sector address of the memory array using a version number stored in the version number data field of the data group, wherein the control circuit is further configured to store one or more frequently updated logical sectors separately from non-frequently updated logical sectors and to store the one or more frequently updated logical sectors in one or more frequently updated random sector clusters, where each one or more frequently updated random sector clusters contains a version number data field and a plurality of physical blocks for storage of a single logical sector, such that each new update of the stored logical sector is written to a new unused physical block of the cluster.

2. The non-volatile memory device of claim 1, wherein the memory device is one of a NAND Flash memory device or a NOR Flash memory device.

3. The non-volatile memory device of claim 1, wherein the control circuit is further configured to access logical sectors of data in the memory array utilizing version based address translation to retrieve the physical address in the memory array associated with the logical address of the accessed logical sector that contains the highest ranked version number.

4. The non-volatile memory device of claim 3, wherein the control circuit is further configured to update logical sectors of data in the memory array by retrieving the highest ranked version number associated with the logical address of a logical sector being updated, incrementing the version number, programming the updated data in a selected available physical block of the memory array, and programming the incremented version number in the version number data field of the selected available physical block.

5. The memory device of claim 4, wherein the control circuit is further configured to program the logical sector of data in a selected available physical block of the memory array with an initial version number stored in the version number data field when the logical address is not yet stored in the memory array.

6. The memory device of claim 1, wherein the plurality of sectors of the memory array are further arranged in a plurality of clusters, each cluster containing a plurality of sequentially addressed sectors, and wherein the control circuit is further configured to access logical sectors of data in the memory array utilizing version based cluster address translation to retrieve the physical cluster that contains the highest ranked version number in the memory array associated with the logical address of the accessed logical sector.

7. A memory device comprising:
a memory array having a plurality of memory cells arranged in a plurality of data groups, wherein each data group is identified by a data group identification and contains a version data field comprising a version number that indicates a version of a particular data group identification, wherein the version number is configured to indicate more than two versions; and
a control circuit, wherein the control circuit is configured to access a data group by translating a logical address of the data group to a physical sector address of the memory array using a version number stored in the version number data field of the data group, wherein the control circuit is further configured to store one or more frequently updated logical sectors separately from non-frequently updated logical sectors and store the one or more frequently updated logical sectors in one or more frequently updated random sector areas, where each one or more frequently updated logical sectors stored in the one or more frequently updated random sector areas contains a version number data field associated with its respective frequently updated logical sector, such that each new update of the stored logical sector is written to a new unused physical sector of the one or more frequently updated random sector areas with an incremented version number.

8. The memory device of claim 7, wherein the control circuit is further configured to access the version number from a table comprising a version number for each data group identification of the memory array.

9. A system comprising:
a host coupled to a non-volatile memory device, wherein the host is configured to store logical sectors of data in the memory device such that each logical sector is identified by a logical sector ID and each logical sector ID is stored in an address translation table in memory with an associated version number to identify a particular physical address, wherein the version number is configured to indicate more than two versions, and wherein the host is further configured to store one or more frequently updated logical sectors in one or more frequently updated random sector clusters of the memory device, where each of the one or more frequently updated random sector clusters contains a version number data field and a plurality of physical blocks for storage of a single logical sector, such that each new update of the stored logical sector is written to a new unused physical block of the cluster.

10. The system of claim 9, wherein the memory device is configured to appear as a rewriteable storage device.

11. The system of claim 9, wherein the host is one of a processor or a memory controller.

12. The system of claim 9, wherein the host is configured to update the address translation table to a more current physical address when a logical sector is updated or moved.

13. The system of claim 9, wherein the host is configured to access the logical sectors of data in the memory device utilizing the address translation table to determine the physical address in the memory device associated with the logical address of the accessed logical sector that contains the highest ranked version number.

14. The system of claim 13, wherein the host is configured to update logical sectors of data in the memory device by retrieving the highest ranked version number associated with the logical address of a logical sector being updated, incrementing the version number, programming the updated data in a selected available physical block of the non-volatile memory device, and programming the incremented version number in the version number data field of the selected available physical block.

15. The system of claim 14, wherein the host is configured to program the logical sector of data in a selected available physical block of the non-volatile memory device with an initial version number stored in the address translation table when the logical address is not yet stored in the memory device.

16. The system of claim 9, wherein the host is configured to access the logical sectors of data in the memory device utilizing the address translation table to determine the physical address in the memory device associated with the logical address of the accessed logical sector that contains the lowest ranked version number.

17. The system of claim 9, wherein the plurality of sectors of the memory device are further arranged in a plurality of clusters, each cluster containing a plurality of sequentially addressed sectors, and wherein the host is configured to access logical sectors of data in the memory device utilizing the address translation table to retrieve the physical cluster that contains the highest ranked version number in the memory device associated with the logical address of the accessed logical sector.

* * * * *